(12) United States Patent
Breuer et al.

(10) Patent No.: US 9,555,781 B2
(45) Date of Patent: Jan. 31, 2017

(54) DETERMINING A TRIGGERING CRITERION FOR VEHICLE BRAKING

(71) Applicant: WABCO GmbH, Hannover (DE)

(72) Inventors: Karsten Breuer, Lauenau (DE); Rudiger Meyer, Hannover (DE); Dirk Sandkuhler, Bad Sassendorf (DE); Christian Sulzbacher, Hannover (DE)

(73) Assignee: WABCO GMBH, Hannover (DE)

( * ) Notice: Subject to any disclaimer, the term of this patent is extended or adjusted under 35 U.S.C. 154(b) by 0 days.

(21) Appl. No.: 14/763,050

(22) PCT Filed: Nov. 30, 2013

(86) PCT No.: PCT/EP2013/003615
§ 371 (c)(1),
(2) Date: Jul. 23, 2015

(87) PCT Pub. No.: WO2014/114310
PCT Pub. Date: Jul. 31, 2014

(65) Prior Publication Data
US 2015/0353062 A1   Dec. 10, 2015

(30) Foreign Application Priority Data
Jan. 25, 2013  (DE) .................... 10 2013 001 228

(51) Int. Cl.
*B60T 7/22*       (2006.01)
*B60T 8/1755*    (2006.01)
*B60W 30/09*     (2012.01)

(52) U.S. Cl.
CPC .............. *B60T 7/22* (2013.01); *B60T 8/17558* (2013.01); *B60W 30/09* (2013.01); *B60T 2201/022* (2013.01)

(58) Field of Classification Search
None
See application file for complete search history.

(56) References Cited

U.S. PATENT DOCUMENTS 5,648,905 A  *  7/1997  Izumi .................. G08G 1/22
                                                           180/169
7,283,902 B2    10/2007  Heider et al.
(Continued)

FOREIGN PATENT DOCUMENTS

DE         69027917 T2    6/1991
DE          4302527 A1    8/1993
(Continued)

*Primary Examiner* — Thomas Tarcza
*Assistant Examiner* — Garrett Evans
(74) *Attorney, Agent, or Firm* — Leydig, Voit & Mayer, Ltd.

(57) ABSTRACT

To determine a triggering criterion for outputting brake signals in a vehicle, at least one object in the vehicle surroundings is sensed, and a determination is made as to whether the vehicle is on a collision course with the object. When a collision course is determined, an avoidance criterion, which is satisfied if an avoidance maneuver is not available, is checked. When the avoidance criterion is met, a braking criterion is checked. The object is classified into at least a first or a second class as a function of its properties, and the avoidance maneuver is determined as a function of such classification such that, in the case of a first class, a first avoidance trajectory is determined, and, in the case of a second class, a second trajectory, different from the first, is determined. The triggering criterion for brake signal output is satisfied when the avoidance and braking criteria are satisfied.

19 Claims, 4 Drawing Sheets

(56) References Cited

U.S. PATENT DOCUMENTS

| | | | |
|---|---|---|---|
| 8,170,739 B2 | 5/2012 | Lee | |
| 2004/0030499 A1* | 2/2004 | Knoop | B60K 31/0008 |
| | | | 701/301 |
| 2004/0193374 A1 | 9/2004 | Hac et al. | |
| 2009/0070039 A1* | 3/2009 | Beuschel | B60T 7/22 |
| | | | 701/301 |

FOREIGN PATENT DOCUMENTS

| | | |
|---|---|---|
| DE | 10012737 B4 | 9/2001 |
| DE | 10154321 B4 | 7/2002 |
| DE | 10352596 A1 | 5/2004 |
| DE | 10336986 B4 | 3/2005 |
| DE | 102005002760 A1 | 8/2005 |
| DE | 102004028404 A1 | 1/2006 |
| DE | 102004056027 A1 | 5/2006 |
| DE | 102004056120 A1 | 5/2006 |
| DE | 102005002504 A1 | 7/2006 |
| DE | 102006034254 A1 | 4/2007 |
| DE | 102008062916 A1 | 6/2010 |
| DE | 102009012226 A1 | 9/2010 |
| DE | 102009020649 A1 | 11/2010 |
| DE | 102010028384 A1 | 11/2010 |
| DE | 102010006214 A1 | 8/2011 |
| DE | 102010018038 A1 | 10/2011 |
| DE | 102010023164 A1 | 12/2011 |
| DE | 102010049351 A1 | 4/2012 |
| EP | 0778507 A2 | 6/1997 |
| EP | 1057159 B1 | 12/2000 |
| EP | 1223093 B1 | 7/2002 |
| EP | 1263634 B1 | 12/2002 |
| EP | 1303421 B1 | 4/2003 |
| EP | 1409310 B1 | 4/2004 |
| EP | 1409311 B1 | 4/2004 |
| EP | 1926646 B1 | 6/2008 |
| EP | 1926647 B1 | 6/2008 |
| EP | 1926654 B1 | 6/2008 |
| WO | WO03006291 A1 | 1/2003 |
| WO | WO2006042512 A1 | 4/2006 |
| WO | WO2008031662 | 3/2008 |
| WO | WO2012/119596 A1 | 9/2012 |
| WO | WO2014114311 A1 | 7/2014 |

* cited by examiner

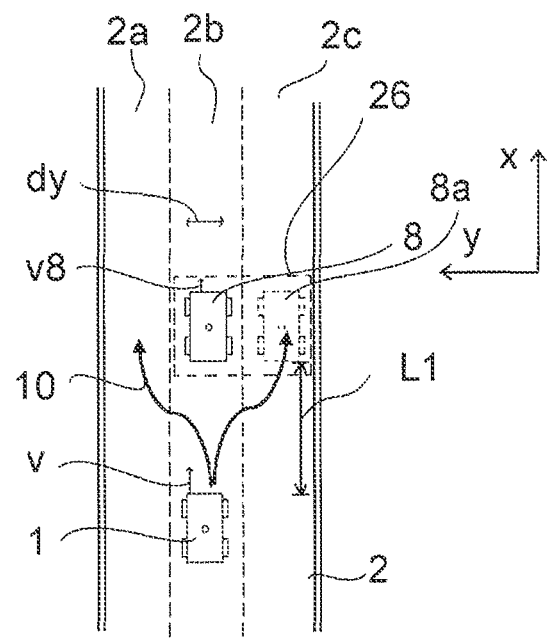
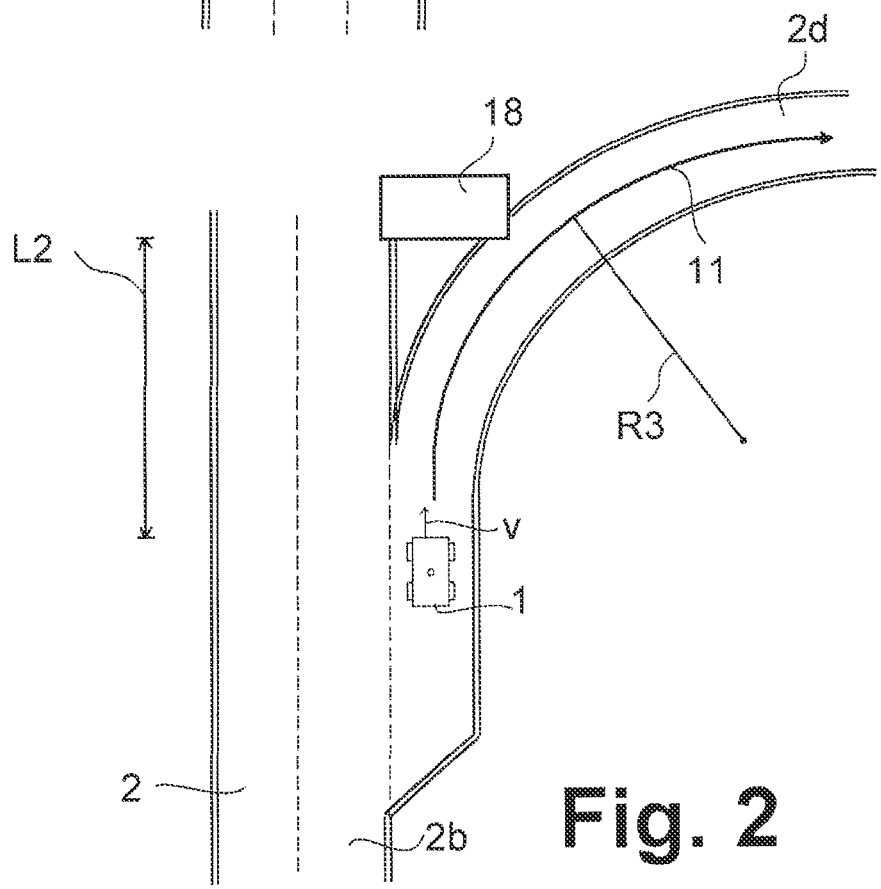

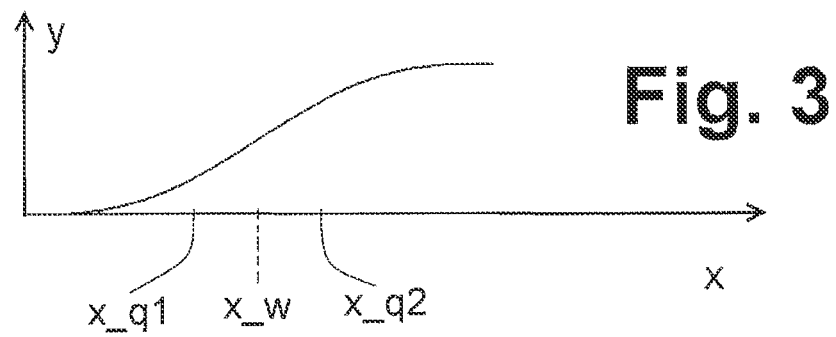
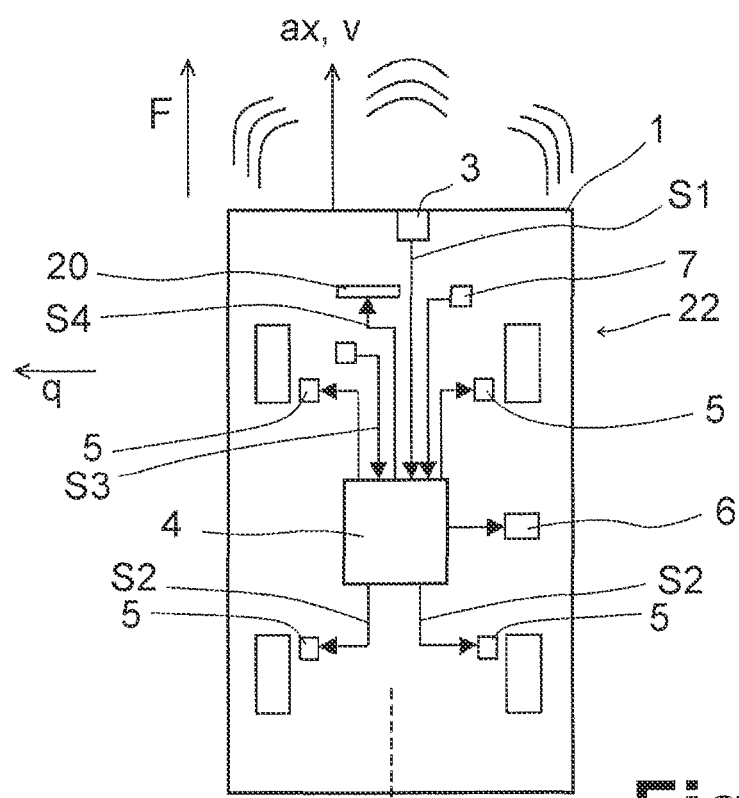

DETERMINING A TRIGGERING CRITERION FOR VEHICLE BRAKING

BACKGROUND OF THE INVENTION

In vehicles, in particular utility vehicles, emergency braking systems generally have surroundings sensor systems that sense the regions in front of the vehicles and determine possible collisions with sensed objects. When a collision course is determined, an automatically acting emergency braking system can be triggered to prevent a collision or at least reduce the severity of the impact of a collision.

However, in the case of vehicle on a collision course, the driver can also, under certain circumstances, avoid colliding with the object, instead of braking. Therefore, avoidance maneuvers are also determined instead of or in addition to emergency braking.

DE 10 2004 056 027 A1 describes a vehicle assistance system for preventing collisions or reducing the severity of a collision in which warning signals can be output to the driver as a function of the determination of a possible collision, and/or an automatic steering intervention and/or braking intervention can be carried out. Instead of braking, it is therefore possible, under certain circumstances, to carry out an automatic steering process for an avoidance maneuver or to display the steering process to the driver.

DE 10 2004 028 404 A1 describes the determination of an avoidance trajectory, for which purpose the trajectory of a vehicle travelling ahead is determined.

DE 10 2010 006 214 A1 describes an emergency braking assistant for automatic braking, wherein driver reaction time is taken into account before the initiation of a braking process. The driver reaction time, an intervention time for braking and an avoidance time for an avoidance maneuver are therefore calculated.

DE 103 369 86 A1 describes a method for avoiding collisions of a vehicle, in which information about the movement behavior of objects in the vehicle surroundings is stored.

DE 100 127 37 B4 describes a device for carrying out a lane change by a vehicle. A trajectory planning device is used to generate a transition curve signal, taking into account that a transverse acceleration that can be predefined by the driver of the motor vehicle is not exceeded. In this context, an essentially S-shaped transition path curve is determined in which the tangent of the transition path curve is the same at the end of the lane change as the determined tangent of the lane. The transition path curve is specified here as a third-order polynomial to determine a sigmoid or S-shaped function of the lateral offset as a function of a longitudinal parameter along the roadway.

DE 101 543 21 B4 describes a vehicle guidance assistance open-loop or closed-loop control system in which, when an obstacle is determined on the roadway, information about the obstacle is acquired and an avoidance path is determined. Map information is used and the avoidance path is determined as a curvature with a sinusoidal mathematical function of the position of the vehicle along the path.

DE 10 2010 023 164 A1 describes a method for warning the driver of a motor vehicle. Possible collisions with sensed objects are determined and a warning criterion is taken into account by specifying a calculated distance from the sensed object; and a steering angle is used.

DE 10 2010 028 384 A1 describes the regulation of the driving stability of a vehicle and the determination of an avoidance path of the vehicle in critical situations. Depending on the critical situation, yaw angles are used, setpoint steering angles are calculated and regulation thresholds are reduced as preparatory measures.

EP 1057159 B1 describes preventing the collision of a vehicle with an obstacle, wherein a plurality of distances from the vehicle are determined in order to take into account, on the one hand, a braking process with maximum deceleration and, on the other hand, steering around the obstacle; in this context, half overlaps of the vehicles can be used.

EP 1303421 B1 describes an automatic braking and steering system in a vehicle in which avoidance paths around an obstacle are determined and additionally taken into account if a further obstacle is located in the avoidance path.

EP 1223093 B1 describes an automatic braking system that can sense the vehicle surroundings and determine lane changes and emergency braking operations. In this context, it is determined whether the driver intends to change lanes, and, in this case, emergency braking is suppressed.

EP 14093211 B1 describes a method for avoiding or reducing a collision, in which objects are sensed and classified into various classes, for example vehicle, motorcycle, stationary building, wherein the classification is carried out by sensing the shape by means of radar and determining the speed of the objects.

EP 1263634 B1 describes a driving stability regulating system in which a trajectory of the vehicle is determined and influenced by means of wheel interventions. In this context, maps and radar information can be used to sense the roadway.

EP 1409310 B1 describes a method for predicting movement trajectories of a sensed object, wherein only possible trajectories of the object are determined in which the forces occurring at the object or the sensed vehicle lie within maximum transmissible values.

EP 1926647 B1 also describes a method for determining a movement trajectory in which the path of the sensed object is extrapolated by specifying polynomials, exponential functions or trigonometric functions.

EP 1926646 B1 describes a method for carrying out an avoidance maneuver by specifying hyperbolic tangent functions and logistical functions as well as arc tangent functions.

U.S. Pat. No. 7,283,902 B2 describes the determination of avoidance maneuvers by using the yaw rate.

EP 1926654 B1 describes further mathematical calculations.

U.S. Pat. No. 8,170,739 B2 describes the determination of an avoidance trajectory by mathematical calculation including the yaw angle and steering angle, wherein fifth-order polynomials are used.

WO 2012/119596 A1 describes the evaluation of an avoidance possibility in highly dynamic situations by predicting hypotheses and predictive display of avoidance possibilities.

However, the initiation of automatic steering processes is generally extremely costly and requires automatically actuable steering devices. Carrying out an emergency braking operation if, under certain circumstances, art avoidance maneuver is still possible, can generally lead to unnecessary problems and damage as a result of, for example, tail-end collisions of vehicles.

SUMMARY OF THE INVENTION

Generally speaking, it is an object of the present invention to provide a method for determining a triggering criterion for braking, and an emergency braking system, which permit a high level of safety.

Inventive embodiments are based on the concept of suppressing the outputting of brake signals as warning signals or else of brake actuation signals of an automatic emergency braking system for as long as it is still possible for the driver to carry out avoidance. As a result, incorrect triggerings are at least largely prevented.

According to the claimed invention, sensed objects are classified differently in order to determine different avoidance trajectories as a function of the classification, in this context, the differentiation is made, in particular, between a travelling object and a stationary object, and different shapes of the avoidance trajectories or different mathematical formulas are specified for the avoidance trajectory as a function of this differentiation or classification.

It can be assumed that a travelling object is travelling on a lane in the region in front of the vehicle, in particular on the same lane. An avoidance trajectory for avoiding a collision should lead past this object and subsequently assume approximately the same direction of travel again; the avoidance trajectory can therefore be determined as a lane change or as travel past the travelling object with subsequent cutting in. The avoidance trajectory is advantageously determined here with an inflection point or S shape (sigmoid). In this context it is recognized that such S-shaped avoidance trajectories have an inflection point in a central region, and a point of extreme transverse acceleration, specifically maximum right-hand curvature and left-hand curvature, respectively before and after the point of transverse acceleration. An extreme value of the transverse acceleration is understood here to be a value of the transverse acceleration that constitutes a relative maximum value in absolute terms, that is, adjacent to transverse acceleration values that have relatively small absolute values. Therefore, these two extreme values can be used directly for the avoidance criterion and compared with one another and the transverse acceleration limiting value.

If, on the other hand, the sensed object is classified as stationary, it is detected that an avoidance trajectory that essentially describes cornering can be specified; it is therefore possible to use, in particular, an avoidance trajectory with a constant curvature radius or a curvature radius within a tolerance range. This is based on the concept that a road sign or, if appropriate, an object among the roadside structures, is determined as a stationary object, and a lane can be selected that leads past the object. When such an avoidance trajectory is used with an essentially constant curvature radius, an essentially constant transverse acceleration will therefore have to be specified during the travel on the avoidance trajectory—with an essentially identical velocity. In this case, it is recognized that such a curved path will, given an identical velocity, lead to relatively low transverse accelerations compared to the S-shaped avoidance trajectory; and therefore when a stationary object is sensed, a smaller minimum distance can be permitted until the avoidance criterion is satisfied, and avoidance is therefore no longer possible.

In order to determine an avoidance trajectory with cornering, map data and navigation data can be additionally used to verify the presence of such a driving path leading away essentially in the shape of a circular arc; however, it is recognized that basically such an avoidance trajectory can also be specified without map data, since such map data is often inaccurate or not up-to-date. This is, in turn, based on the concept of preventing incorrect triggering of emergency braking and also at the same time taking into account such avoidance possibilities that may possibly be present.

According to an embodiment of the present invention, a plurality of sensed objects, which are located sufficiently close to one another, can be sensed or evaluated as a common object and therefore one avoidance trajectory can be positioned around the commonly sensed plurality of objects.

The avoidance trajectories are advantageously determined relative to the driver's own projected driving path (own trajectory) or the driving corridor in front of the driver's vehicle. Therefore, for example, in the case of cornering, it is taken into account that an avoidance trajectory should correspondingly be specified as a change compared to the projected trajectory of the vehicle. For this purpose, a curve parameter along the driving path can correspondingly be set as a parameter instead of the linear X direction along a linear roadway.

Furthermore, driving corridor considerations can also be used to take into account partial overlapping of the vehicles.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The present invention is discussed in greater detail below with reference to the appended drawings, in which:

FIG. 1 is a plan view of a road scene with a vehicle during the determination of an avoidance maneuver around a travelling object, in accordance with an embodiment of the present invention;

FIG. 2 shows a corresponding illustration when an avoidance maneuver around a stationary object is determined;

FIG. 3 shows an illustration of a sliding sine function for the determination of an avoidance trajectory according to FIG. 1;

FIG. 4 shows a vehicle with an emergency braking system according to an embodiment of the present invention;

LIST OF REFERENCE CHARACTERS

Figure 5:
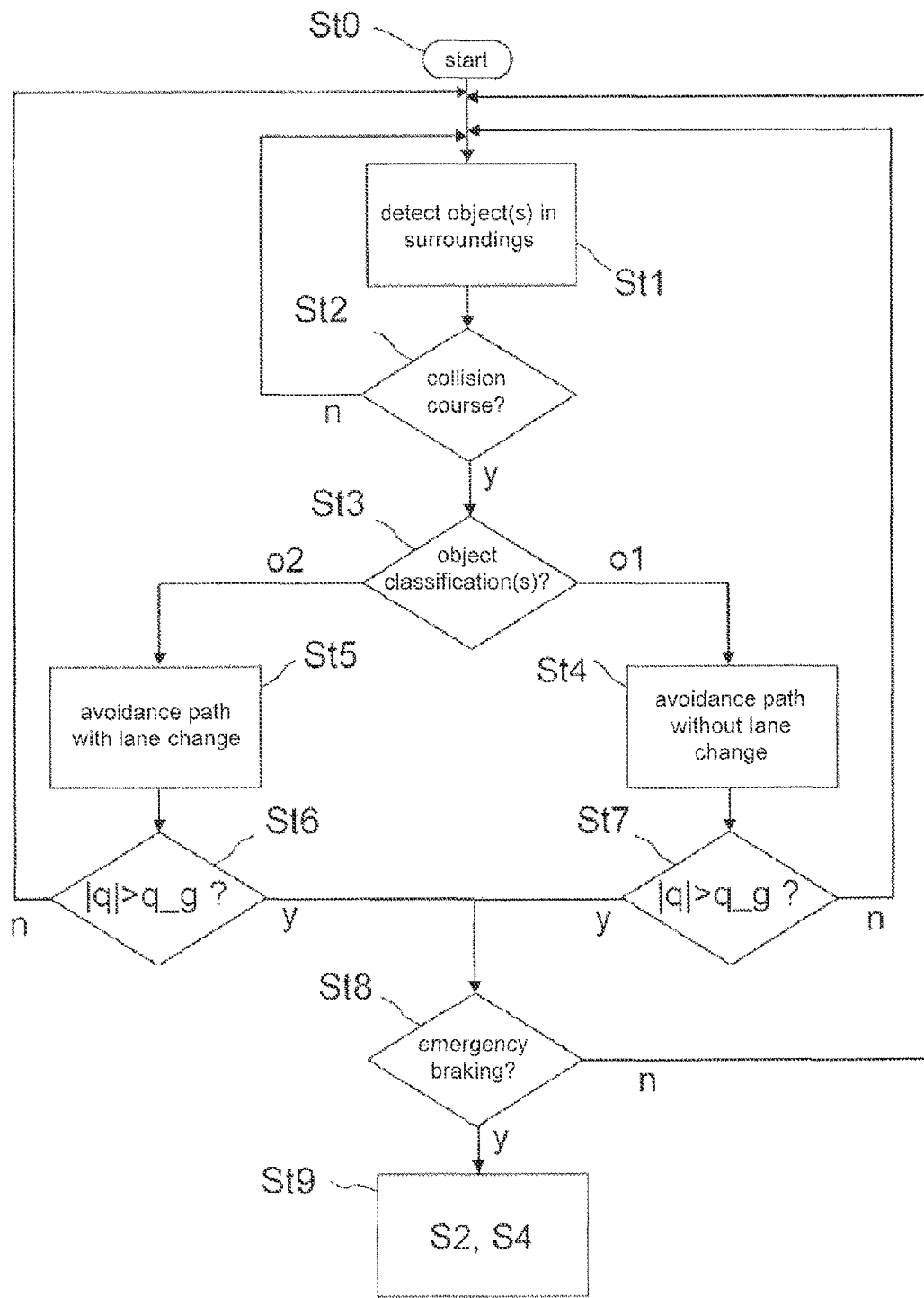
FIG. 5 is a flowchart illustrating a method for according to an embodiment of the present invention.

1 Vehicle
2 Roadway
2a-2d Lanes
3 Distance sensors
4 Control device
5 Brake actuation devices
6 Memory
7 Navigation device
8 Moving object (further vehicle)
8a Further moving object
10 Avoidance trajectory for lane change
11 Avoidance trajectory for cornering
18 Stationary object (road sign)
20 Display device
22 Emergency braking system
26 Common object space
F Direction of travel v Velocity
ax Longitudinal acceleration
q Transverse acceleration
ω Yaw rate
t Time
t0 Current point in time
tz Preceding point in time
tz to t0 Preceding time period
x x-direction, longitudinal direction, Cartesian coordinate
y y-direction, lateral direction, Cartesian coordinate
v8 Velocity
a8 Longitudinal acceleration of object 8
q8 Transverse acceleration of object 8
dvy8 Lateral speed
dx8 Distance in longitudinal direction
dy8 Transverse offset
S1 Surroundings sensor system signals
S2 Brake control signals
S3 Vehicle movement dynamics status signals
S4 Brake warning signal
x_w Inflection point
x_q1 First extreme value
x_q2 Second extreme value
dy Lateral offset
dx Distance
dvy Lateral relative speed
dvx Relative longitudinal speed
dax Relative longitudinal acceleration
L1 Minimum distance for avoidance trajectory 10 in FIG. 1
L2 Minimum distance for avoidance trajectory 11 in FIG. 2
K_avoid Avoidance criterion
K_brake Braking criterion
K_B Triggering criterion for braking
v_m Measuring limiting value
q_g Transverse acceleration limiting value
R1, R2 Curve radii in avoidance trajectory 10
R3 Curve radius in avoidance trajectory 11
phi Angle
Lbr Curve for minimum braking distance
L10, L11 Curves for avoidance trajectories 10, 11

DETAILED DESCRIPTION OF THE PREFERRED EMBODIMENTS

A vehicle 1, in particular a utility vehicle, is travelling according to FIG. 1 on a roadway 2 with three lanes 2a, 2b, 2c in a current direction of travel F at a velocity v. At the current point in time t0, the vehicle 1 is travelling, for example, linearly, that is, its transverse acceleration q (t0)=0.

The vehicle 1 is shown in more detail in FIG. 4 and has an environment sensor system, for example distance sensors 3 based on radar or ultrasound, for sensing objects in front of the vehicle 1 and, if appropriate, side regions outside the roadway 2. The environment sensor system can additionally also sense areas laterally next to the vehicle 1 or else behind the vehicle 1. The environment sensor system can also have, for example, camera systems for visually sensing the roadway. Furthermore, the vehicle 1 has, according to FIG. 4, a control device 4 of a braking system or of an emergency braking system 22 as well as brake actuation devices 5, which are actuated by the control device 4 by brake control signals S2. The control device 4 picks up surroundings sensor system signals S1 from the environment sensor system 3. The control device 4 also picks up vehicle movement dynamics status signals S3, for example via a vehicle-internal databus, which signals indicate the vehicle's velocity v, and also, for example, a longitudinal acceleration ax and/or transverse acceleration q. In this context, the control device 4 can also determine the velocity v, for example from wheel speed signals, and the longitudinal acceleration ax as a derivative of the velocity v over time.

According to one embodiment, the vehicle 1 has a navigation device 7, which detects the current position of the vehicle 1 in map data and, for this purpose, either has stored map data or receives it on an up-to-date basis.

According to FIG. 1, a further vehicle 8 is travelling as an active road user in front of the vehicle 1 at a time t0 on the same lane 2b, here the center lane. The vehicle 1 first senses, by its environment sensor system 3, the further vehicle 8 as an object 8, and stores the determined data of the object 8 in a memory 6, which is connected to the control device 4 or embodied as part of the control device 4. In this context, the control device 4 stores, in particular, travel properties, in particular data about the velocity v8, if appropriate also longitudinal acceleration a8 and transverse acceleration q8 of the object 8 over a preceding time period of tz to t0. This data serves, on the one hand, to classify the object 8 and, on the other hand, to determine whether a collision course is present; for this determination, known per se, of a collision course it is also possible to use further determined data, in particular the lateral speed dvy8, distance in the longitudinal direction dx8, and the transverse offset dy8; all the data can be used relative to the vehicle 1 in this case.

The control device 4 of the vehicle 1 therefore senses the object 8, classifies it, determines an avoidance trajectory and decides on the basis of an avoidance criterion K_avoid whether an avoidance maneuver is respectively possible and furthermore on the basis of a braking criterion K_brake whether an emergency braking maneuver is necessary; furthermore, supplementary criteria can be added.

The sensing of the object 8 constitutes the step St1 in the flowchart in FIG. 5. In the following step St2 the control device 4 determines whether the driver's vehicle 1 is on a collision course with the sensed object 8 (or the sensed object 8 is on a collision course with the vehicle 1). For this purpose, a current distance dx8 from the sensed object 8 is detected and the current trajectory of the vehicle 1 is determined on the basis of its vehicle movement dynamics data, in particular velocity v, longitudinal acceleration a, transverse acceleration q and/or, if appropriate, yaw rate ω, and extrapolated. Correspondingly, the current trajectory of the moving object 8 is extrapolated on the basis of its vehicle movement dynamics data relative to the driver's vehicle, in particular lateral offset dy8, lateral relative speed dvy8, distance dx8, relative longitudinal speed dvx8 and relative longitudinal acceleration dax8, and it is subsequently cheeked whether the trajectories intersect in the following time period, which is detected as a collision course. In the case of FIG. 1 with unidimensional movements of the vehicle 1 and of the moving object 8, a second-order differential equation in time can therefore be determined, that is, taking into account the current distance dx8, the differential speed v−v8, and the current longitudinal accelerations ax and a8.

When a collision course is not present, according to branch n, resetting occurs before the first step St1, and when a collision course is determined, according to branch y, an avoidance criterion K_avoid is subsequently checked. In the case of the determination of the avoidance criterion K_avoid, in step St3 the sensed object 8 is initially classified. For this purpose it is determined whether the sensed object 8 at least temporarily did not exhibit a stationary state in a preceding detection time period from tz to the current point in time t0, that is, the velocity v8 was above a measuring limiting value v_m, which indicates measuring inaccuracy and, for example, can be several km/h.

If v8<v_m was the case in the entire detection time period, a sensed object is sensed as a stationary object; FIG. 2 shows this case tor a road sign 18 as a stationary object 18. Other objects that exhibited v8>v_m at least temporarily are classified as moving objects or road users, like in FIG. 1 the moving object 8, that currently exhibits v8>v_m. It is possible to differentiate here between currently stationary moving objects, that is, v8 (t0)<v_m, where v8>v_m within tz to t0, for example vehicles at the end of a traffic jam or in an accident, and currently travelling objects 8 that exhibit v8 (t0)>v_m. However, such differentiation and classification is not necessary.

Different avoidance trajectories are subsequently determined as a function of the classification in step St3. When a stationary object 18 is determined, according to branch o1 in step St4 an avoidance trajectory 11 is subsequently performed for cornering without a lane change, in particular with an essentially constant curve radius, for a stationary object 18, as is shown in FIG. 2. When an at least temporarily non-stationary object 8, that is, a road user, is determined, according to the branch o2 an avoidance trajectory 10 is determined for a lane change according to FIG. 1 in step St5.

The determination of the avoidance trajectories in steps St5 and St4 serves respectively to determine a transverse acceleration q, which is maximum in terms of absolute value, of the vehicle 1. For this purpose, intentional simplifying trajectory functions are specified for the avoidance trajectories 10 and 11.

Initially, with respect to the case of sensing a moving object 8 according to FIG. 1, in step St5 the avoidance trajectory 10 is determined such that a lane change occurs from the current lane 2b to an adjacent lane 2a or 2c. In this context, the final orientation of the vehicle 1 at the end of the avoidance trajectory 10 or at the end of the avoidance maneuver corresponds essentially to the current orientation. Either the vector of the velocity v, that is, the direction of travel F, or the alignment of the longitudinal axis L can be specified here as the orientation. An avoidance trajectory 10 with an inflection point x_w, that is, a change in the curvature direction of the avoidance trajectory 10, is specified. In this context it is recognized that the transverse acceleration q in the avoidance trajectory 10 has two extreme values, a first extreme value x_q1 before the inflection point x_w, that is, the curve movement in the first region of the trajectory, for example to the left, and a second extreme value x_q2 after the inflection point x_w, that is, in the second region of the trajectory with opposing deflection, for example to the right.

In the case of an avoidance maneuver from the center lane 2b to the adjacent left-hand lane 2a, a steering lock deflection to the left and therefore a trajectory profile of the avoidance trajectory 10 with left-hand curvature therefore takes place. The transverse acceleration q therefore increases from the current straight-ahead travel initially to the first extreme value x_q1 of the transverse acceleration q, and subsequently the transverse acceleration q decreases in terms of absolute value until the inflection point w is reached. At the inflection point w, a change in the curvature direction occurs, therefore from the left-hand deflection to the right-hand deflection or from the left-hand bend to a right-hand bend, with the result that, given an ideal assumption, for example, without skidding behavior, a zero crossover of the transverse acceleration q is present, that is, q (t_w)=0. The transverse acceleration q subsequently increases again in terms of absolute value during the subsequent trajectory section with right-hand curvature, up to the second extreme value x_q2, after which the transverse acceleration q decreases again. The avoidance trajectory 10 in the first case in FIG. 1 is advantageously determined such that it merges smoothly and in a continuously differentiable fashion into straight-ahead travel on the adjacent lane 2a.

FIG. 3 shows, as an avoidance trajectory, the preferred sliding sine function y=x−sin (x), i.e. the additive superimposition of a linear term and of a trigonometric function with respect to the coordinates x, y in the coordinate, system. In the case of illustration or calculation in a Cartesian coordinate system, the longitudinal direction of the lane, in FIG. 1 therefore the Cartesian coordinate x, is therefore taken, and the lateral direction y as the second coordinate. The avoidance trajectory 10 is therefore described as a sliding sine function of the relationship y (x). For this purpose, in a simple case it is possible to specify, for example, the sliding sine function y=x−sin (x) with y and x as dimensional numbers. The sine is therefore related to the radiant angle unit; sin ($\pi$)=sin (3.1415 . . . )=sin (2$\pi$)=0 and sin ($\pi$/2)=1. As a result, a function is obtained that in the first period, that is, from 0 to 2$\pi$=6.28 . . . , a function with suitable formulation is reached that has an inflection point, can be differentiated continuously twice and at the same time also has smooth transitions at the starting time x=0 and end time x=2$\pi$. In this context, it is advantageous that the first and second derivative also each constitute trigonometric functions, in particular also the second derivative itself is a purely trigonometric function; in the case of the simple sliding sine function y=x−sin (x), it is therefore found that y'=1−x cos (x) and y"=sin (x). The transverse acceleration is determined by the curvature of the curve of the avoidance trajectory and the vehicle speed at the respective curve points along the x axis:

$$ay(x) = v(x)^2 * \kappa(x)$$

$$\kappa(x) = \frac{y(x)''}{(1 + (y(x)')^2)^{\frac{3}{2}}}$$

The extreme values of the transverse acceleration are determined using the zero positions of the first derivative of the transverse acceleration:

$$ay'(x)=0 \Rightarrow x_{ay1}, x_{ay2} \Rightarrow \text{Extremwerte}: ay_1=ay(x_{ay1}); ay_2=ay(x_{ay2})$$

The x axis represents the movement in the longitudinal direction or direction of travel, and the y axis in FIG. 3 represents the movement in the lateral direction. The function is subsequently correspondingly extended or stretched. Therefore, in the longitudinal direction a distance L is used, and also a lateral extent dy of the transverse offset that is to be overcome. For the avoidance process, the period 2$\pi$ of the sine is therefore scaled to the distance L, and the avoidance trajectory 10 is stretched in the lateral direction such that the lateral offset dy (y(L)=dy) is reached after the distance L.

First, the following equation is obtained:

$$y = \frac{dy}{L}x - \frac{dy}{2\pi}\sin\left(\frac{2\pi}{L}x\right)$$

The distance L from the object 8 can be calculated, for example, from the sum of the current distance dx at the point in time t0 and the distance that the object covers in the period of time that the driver's vehicle requires to reach the object.

The necessary lateral offset dy can be composed, for example, of the sum of a half width of the driver's vehicle, half the width of the object 8, the transverse offset between the driver's vehicle and the object, at the point in time at which the driver's vehicle reaches the object, and a possible safety distance.

The absolute values of the maximum values of the acceleration q1 and q2 are subsequently compared with a transverse acceleration limiting value q_g in step St6, and it is determined whether the permissible transverse acceleration limiting value q_g is exceeded. For this purpose, the maximum absolute values of q1 and q2 are initially determined and subsequently compared with q_g.

The avoidance criterion for subsequent initiation of emergency braking is obtained here if the transverse acceleration limiting value q_g is exceeded and therefore an avoidance maneuver around a travelling object 8 is no longer possible. Therefore, in step St6, when the avoidance criterion K_avoid is not satisfied, and therefore an avoidance is still possible, resetting occurs according to branch n, and when the avoidance criterion K_avoid is satisfied, a braking criterion is subsequently examined according to branch y.

If in step St3 it is determined that a stationary object 18 has been sensed, instead of an avoidance trajectory with an inflection point an avoidance trajectory 11, which is shown in FIG. 2 with an essentially identical curve radius R3 is determined such that the avoidance trajectory 11 also leads past the sensed stationary object 18. In particular, in this case in FIG. 2 map data can be additionally used in order to determine whether the driving path of the determined avoidance trajectory 11 lies on a permissible lane 2d, for example an exit, or branch. The determination according to FIG. 2 can, however, also be carried out without the presence of such map data, in particular if a precise determination of the position is not reliable or not possible. Therefore, according to FIG. 2 the avoidance trajectory 11 is determined as a right-hand bend with a constant radius R3, with the result that the transverse acceleration q that occurs when travelling along the avoidance trajectory 11 is given in each case, as a function of the distance s travelled on the avoidance trajectory, as $q=v(s)^2/R3$.

The transverse acceleration q in the case of constant velocity v is therefore constant on the avoidance trajectory 11, and in the case of changes in v, for example as a result of a braking process, it changes correspondingly. The avoidance trajectory 11 determined in FIG. 2 with a constant curve radius R3 permits a shorter minimum distance L2 than the minimum distance L1 in the case of FIG. 1; given the same current velocity v in the cases in FIG. 1 and FIG. 2, L2<L1 will therefore be the case whenever the transverse acceleration limiting value q_g is reached. This means that the avoidance criterion K_avoid is not satisfied as quickly according to FIG. 2; small minimum distances L2 can be achieved without the avoidance criterion being satisfied. It is therefore possible, in a step S7, which follows the step St4, to compare the current transverse acceleration q (v, R3) with the permissible limiting transverse acceleration q_g; in turn, in the case of undershooting according to branch n the method is reset, and in the case of overshooting according to branch y further criteria are subsequently checked in step St8, and otherwise resetting occurs according to branch n.

In step St8, the braking criterion K_brake is first checked to determine whether an emergency braking process is to be initiated; in this context, an emergency braking process with maximum braking force a_br can be represented as, for example, a distance equation with a second order of time specified with L1 or L2, v and a, for example as $L1<(a\_br*t^2)/2+vt$.

Furthermore, a delay can be taken into account by means of an activation time t_akt of the brake actuators, if appropriate also a reaction time t_react of the driver.

Therefore, in step St8 it is checked whether an emergency braking operation is possible if before the sensed object 8 or 18, wherein for this purpose an automatic emergency braking operation and an emergency braking operation, which is initiated by the driver after warning of the driver, can be examined, in a first step it is therefore possible initially to check whether, by including the human reaction time t_react, the driver cannot initiate an emergency braking operation, i.e. if a brake warning signal S4 output by control device 4 to the driver, for example to a display device 20 in the cockpit region. Furthermore, it is possible to check whether an automatic emergency braking operation is to be initiated by a brake actuation signal S2.

If K_avoid and K_brake are satisfied, a triggering criterion K_B for braking of the vehicle is thereby satisfied. In the simplest case K_B is therefore given by K_avoid and K_brake, i.e.:

$$K\_B = K\_\text{avoid} * K\_\text{brake},$$

wherein the three variables each assume Boolean values 1 and 0, and "1" means satisfied.

In addition, a driving corridor criterion can advantageously be specified, which partially takes into account overlapping of the vehicle with the object 8 or 18.

If the triggering criterion K_B is satisfied in step St8, the outputting of the brake warning signal S4 and/or brake actuation signal S2 takes place in step St9.

Furthermore, it is possible to predefine that, even when it is determined that a collision will take place even when emergency braking is initiated immediately, corresponding brake actuation signals S2 are output to the brake actuation devices 5 in step St9 in order to reduce the severity of the impact by means of the emergency braking.

For the determination of the avoidance trajectory 10, it is possible to specify a sliding sine function in polar coordinates instead of the Cartesian coordinates x, y shown in FIG. 1. This is preferably done during cornering where the avoidance trajectory is transferred from one curve radius R1 to another R2, which corresponds to a change of driving corridor. The curve radii R1 and R2 each have the same zero point as reference point, that is, with the distance r from the zero point, and a polar angle Phi, wherein the difference between the curve radii correspond to the lateral offset: R1−R2=dy and the arc length along the radius R1 constitute the avoidance space L available in the longitudinal direction. The curve radius R1 is then changed, via the angle phi, to the curve radius R2 using the avoidance trajectory:

$$\Rightarrow r(phi) = \frac{dy}{L} phi * R1 - \frac{dy}{2\pi} \sin\left(\frac{2\pi}{L} phi * R1\right) + R1,$$

$$phi \in 0 \ldots \frac{L}{R1}$$

$$r(0) = R1$$

$$r\left(\frac{L}{R1}\right) = dy + R1 = R2$$

In the situation in FIG. 1 and FIG. 2, a plurality of sensed objects 8, 18 can also be combined as a common object space 26 during the determination of the respective avoidance trajectory 10, 11. This is indicated by a dashed line by objects 8 and 8a in FIG. 1, which are therefore evaluated as a common object space 26, with the result that the avoidance trajectory 10 or 11 is positioned around the common object, for example to the left and not to the right in FIG. 1.

If the vehicle 1 is equipped with an automatic steering system or steering actuation device, an automatic avoidance maneuver can also be determined.

Figure 6:
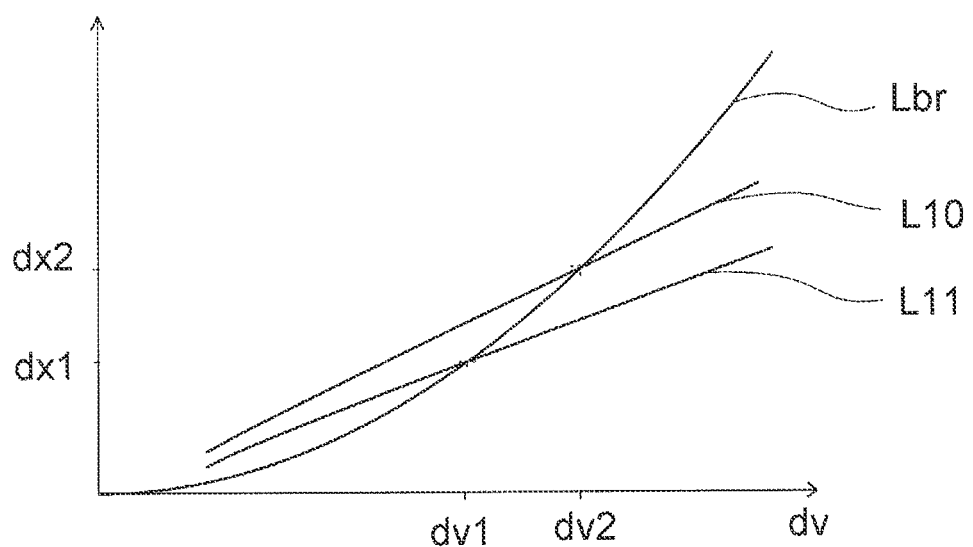
FIG. 6 illustrates the minimum distances as a function of the relative speed during various maneuvers.

FIG. 6 shows a plot of the relative distance dx of the vehicle and of the object 8 or 18 with respect to the corresponding relative speed dv. In this context, a curve L10 shows the minimum distance L1 in the case of FIG. 1, i.e. the avoidance trajectory 10 for the lane change, and a curve L11 shows the minimum distance L2 in the case of FIG. 2, i.e. of the avoidance trajectory 11 for cornering; furthermore, a curve Lbr for a braking minimum distance is displayed, in the case where full braking of the vehicle 1 still just avoids a collision. Of interest here are, in particular, the marked intersection points dx1, dv1 and dx2, dv2 of the curves L10 and L11 with Lbr. Basically, L11 extends below L10; the following applies here: dx1<dx2 and dv1<dv2.

Therefore, a collision can still be avoided up to dv2 for the avoidance trajectory 10 in FIG. 1 by braking, since the curve Lbr extends below L10 up until then; correspondingly, a collision can be avoided by braking up to dv1 for the avoidance trajectory 11 in FIG. 2, since the curve Lbr extends below L11 up until then.

In order to trigger the braking, both the braking criterion K_brake and the respective avoidance criterion K_avoid must be satisfied. Since, according to the described embodiment, only braking is performed and an automatic steering intervention is not provided, in order to prevent an accident the avoidance criterion K_avoid must be satisfied before the braking criterion K_brake. Otherwise, it would already be too late for braking, and only the severity of the accident could be alleviated. With the avoidance trajectory 10 for the lane change, it is therefore still possible to brake with the effect of avoiding an accident at relatively high relative speeds dv since the avoidance is already no longer possible at an earlier time.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and ail statements of the scope of the invention that, as a matter of language, might be said to fall there-between.

What is claimed is:

1. A method for triggering the output of at least one brake signal in a vehicle, the method comprising:
   using at least one detector, sensing at least one object in surroundings of the vehicle;
   using at least one controller, determining whether the vehicle is on a collision course with the at least one object;
   when the vehicle is on a collision course with the at least one object, classifying the at least one object into at least one of a first class or a second class as a function of properties of the at least one objects;
   determining, as a function of the classification of the at least one object, an avoidance path of the vehicle such that when the at least one object is classified in the first class, a first avoidance path is determined according to a first function, and when the at least one object is classified in the second class, a second avoidance path is determined according to a second function different from the first function;
   checking an avoidance criterion that is satisfied when the avoidance path cannot be determined or is not possible for the vehicle;
   when the avoidance criterion is satisfied, checking a braking criterion that is satisfied when emergency braking of the vehicle is necessary; and
   triggering output of at least one brake signal when the avoidance criterion and the braking criterion are satisfied.

2. The method as claimed in claim 1, wherein the at least one brake signal is a brake control signal or a brake warning signal.

3. The method as claimed in claim 1, further comprising determining a driving corridor criterion, and wherein triggering output of the at least one brake signal is effected only when the driving corridor criterion is also satisfied.

4. The method as claimed in claim 1, wherein classifying the at least one object includes detecting at least one of geometric properties and dynamic properties of the at least one object in a detection time period, the dynamic properties including velocity of the at least one object or acceleration of the at least one object, and the geometric properties including at least one of shape of the at least one object, size or extent of the at least one object, and position of the at least one object.

5. The method as claimed in claim 1, wherein the at least one object is classified into at least one of the following classes: (i) a stationary object class in which the at least one object has not shown any movement in a detection time period, and (ii) a travelling or stationary object class, characterized by a velocity above a measuring limiting value achieved at least temporarily in the detection time period.

6. The method as claimed in claim 5, wherein the travelling or stationary object class includes: (i) a currently travelling object class characterized by a current velocity above the measuring limiting value, and (ii) a stationary object class characterized by the velocity above the measuring limit value being at least temporarily achieved in the detection time period; and wherein determining the first avoidance path includes determining identical or similar avoidance paths for objects in the travelling object class or determining identical or similar avoidance paths for objects in the stationary object class.

7. The method as claimed in claim 5, wherein when the at least one object is in the travelling or stationary object class, determining the first avoidance path includes determining a lane change trajectory or driving corridor change trajectory of the vehicle.

8. The method as claimed in claim 5, wherein when the at least one object is in the travelling or stationary object class, determining the first avoidance path includes determining a final orientation of the vehicle within a tolerance range corresponding substantially to a current orientation of the vehicle.

9. The method as claimed in claim 5, wherein when the at least one object is in the stationary object class, determining a second avoidance path having a curve radius that is constant within a tolerance range at least in a final region.

10. The method as claimed in claim 1, further comprising determining whether a lane profile of the first avoidance path of the vehicle is possible with reference to map or other navigation data.

11. The method as claimed in claim 1, further comprising determining a relative avoidance path of the vehicle that constitutes a path change compared to a projected path for the vehicle, the projected path being an extrapolation of a path of the vehicle passed through in an evaluation time period.

12. The method as claimed in claim 11, wherein at least one of the following variables is determined in polar coordinates with an angle variable and a radius variable: the relative avoidance path, the first avoidance path, the second avoidance path, the projected path, vehicle movement dynamics properties, vehicle movement dynamics properties of the at least one object, driving corridor, lane change, and driving corridor change.

13. The method as claimed in claim 1, wherein classifying the at least one object is effected before determining whether the vehicle is on a collision course with the at least one object.

14. The method as claimed in claim 1, further comprising combining a plurality of adjacent ones of the at least one object to form a common object space, a distance between the adjacent ones of the at least one object being shorter than a width or scaled width of the vehicle.

15. The method as claimed in claim 1, further comprising determining at least one extreme value of a transverse acceleration acting on the vehicle based on at least one of the first avoidance path and the second avoidance path, and
comparing the at least one extreme value with a transverse acceleration limiting value as the avoidance criterion that is satisfied when the at least one extreme value is larger in absolute terms than the transverse acceleration limiting value.

16. The method as claimed in claim 5, wherein a minimum distance at which the avoidance criterion is satisfied is smaller when the at least one object is in the stationary object class than when the at least one object is in the travelling or stationary object class.

17. An emergency braking system for a vehicle, the system comprising: an environment sensor system and at least one control device configured to effect the method claimed in claim 1.

18. A vehicle, comprising the emergency braking system as claimed in claim 17.

19. The method as claimed in claim 1, wherein the first function specifies a first set of one or more mathematical formulas and the second function specifies a second set of one or more mathematical formulas.

* * * * *